United States Patent
Bayerle et al.

(10) Patent No.: US 7,661,262 B2
(45) Date of Patent: Feb. 16, 2010

(54) METHOD AND DEVICE FOR MONITORING A HEATING UP OF AN EXHAUST GAS CATALYTIC CONVERTER OF AN INTERNAL COMBUSTION ENGINE

(75) Inventors: Klaus Bayerle, Obertraubling (DE); Wolfgang Moser, Regensburg (DE); Olivier Pioch, Bad Abbach-Lengfeld (DE)

(73) Assignee: Siemens Aktiengesellschaft, Munich (DE)

( * ) Notice: Subject to any disclaimer, the term of this patent is extended or adjusted under 35 U.S.C. 154(b) by 885 days.

(21) Appl. No.: 11/117,199

(22) Filed: Apr. 28, 2005

(65) Prior Publication Data
US 2005/0241298 A1 Nov. 3, 2005

(30) Foreign Application Priority Data
Apr. 30, 2004 (DE) .................. 10 2004 021 339

(51) Int. Cl.
*F01N 3/00* (2006.01)
(52) U.S. Cl. ................ 60/277; 60/274; 60/284
(58) Field of Classification Search ............ 60/274, 60/284, 285, 299, 277
See application file for complete search history.

(56) References Cited

U.S. PATENT DOCUMENTS

| | | | | |
|---|---|---|---|---|
| 5,878,732 A | * | 3/1999 | Engl et al. | 123/673 |
| 5,972,075 A | * | 10/1999 | Fukuda et al. | 95/15 |
| 6,065,449 A | * | 5/2000 | Fukuma | 123/436 |
| 7,155,899 B2 | * | 1/2007 | Beer et al. | 60/284 |

FOREIGN PATENT DOCUMENTS

| | | |
|---|---|---|
| DE | 196 12 455 A1 | 10/1997 |
| DE | 100 16 123 A1 | 10/2001 |
| DE | 101 63 022 A1 | 7/2003 |
| DE | 103 28 855 A1 | 1/2004 |
| WO | WO 97/35103 | 9/1997 |
| WO | WO 00/23694 A2 | 4/2000 |

OTHER PUBLICATIONS

Richard van Basshuysen, Fred Schäfer, "Handbuch Verbrennungsmotor—Grundlagen, Komponenten, Systeme, Perspektiven", (Manual Combustion Engine—Bases, Components, Systems, Perspectives), Jun. 2002, pp. 554-559, 2nd Edition, Vieweg Publishing House, Germany.

\* cited by examiner

*Primary Examiner*—Thomas E Denion
*Assistant Examiner*—Diem Tran
(74) *Attorney, Agent, or Firm*—King & Spalding, L.L.P.

(57) ABSTRACT

An internal combustion engine has an intake duct, at least one cylinder that takes in air via the intake duct and an exhaust gas duct, in which the exhaust gas catalytic converter is located, and into which the combusted air/fuel mixture is ejected from at least one cylinder. Depending on measurement values that are determined by sensors, input signals for the control of actuators of the internal combustion engine are generated by means of control functions based on torsional moment and by means of a dynamic charging model of the intake duct. A measurement is determined, which characterizes the difference of a desired air mass flow into the respective cylinder from an actual air mass flow into the cylinder. Depending on the measurement, a proper or improper heating up of the exhaust gas catalytic converter is identified.

13 Claims, 4 Drawing Sheets

METHOD AND DEVICE FOR MONITORING A HEATING UP OF AN EXHAUST GAS CATALYTIC CONVERTER OF AN INTERNAL COMBUSTION ENGINE

CROSS REFERENCE TO RELATED APPLICATION

This application claims priority of the German application No. 10 2004 021 339.9 DE filed Apr. 30, 2004, which is incorporated by reference herein in its entirety.

FIELD OF THE INVENTION

The field of the invention is directed toward a method to monitor the heating up of an exhaust gas catalytic converter of an internal combustion engine.

BACKGROUND OF THE INVENTION

Increasingly stringent legal regulations make it necessary to decrease as much as possible the raw exhaust gas emissions generated by the combustion of the air/fuel mixture in the respective cylinders of internal combustion engines. Also in use in internal combustion engines are exhaust gas post-treatment systems that convert into harmless substances those pollutant emissions that are produced during the combustion process of the air/fuel mixture in the cylinder. An exhaust gas catalytic converter that is located in the exhaust gas duct of the internal combustion engine is regularly used for this purpose. High efficiency for the conversion of the pollutant components by the exhaust gas catalytic converter can be guaranteed only when it has at least reached its activation temperature. The activation temperature of the exhaust gas catalytic converter, for example, is 300° C. Therefore, it is very important to bring the exhaust gas catalytic converter up to its activation temperature as soon as possible after a cold start of the internal combustion engine.

On one hand, the mass of air in the cylinders is increased for this purpose by increasing an idling speed, and the combustion efficiency of the air/fuel mixture is impaired at the same time by a late shift of the ignition angle. The exhaust gas coming out of the cylinders during the exhaust cycle thereby easily reaches a very high temperature and thus has sufficient thermal energy to heat up the exhaust gas catalytic converter quickly. Legal regulations in individual countries require that this heating up of the exhaust gas catalytic converter be monitored.

The use of a functional architecture based on torsional moment is common for the control of internal combustion engines, for which all requirements that can be formulated as torsional moment or efficiency are actually defined on the basis of these physical quantities. Thus results a clear and concise structure with integrated interfaces defined by torsional moments or efficiencies. A functional structure of this type based on torsional moment for the control of an internal combustion engine is, for example, known from the reference book "Handbuch Verbrennungsmotoren" (Internal Combustion Engines Manual), editors Richard von Bass Huysen/Fred Schäfer, 2nd edition, Vieweg Verlag, 2002, pages 554 to 557.

Furthermore, it is common for the control of internal combustion engines to dynamically model the dynamics of an intake duct of the internal combustion engine over which the cylinder takes in air by means of an intake manifold charging model. This makes it possible to easily and precisely estimate an actual air mass flow into the respective cylinder also during transient operation of the internal combustion engines on the basis of various measurement categories such as, for example, a degree of opening of a throttle valve. In addition, an intake manifold charging model of this type can also be inverted such that a degree of opening of the throttle valve is determined, depending on an air mass flow to be adjusted in the respective cylinders. An intake manifold charging model of this type is likewise known from the reference book mentioned above, "Handbuch Verbrennungsmotor" (Internal Combustion Engine Manual), 2nd edition, pages 557 to 559.

In addition, a dynamic intake manifold model for an internal combustion engine is also known from WO 97/35106. A functional structure based on torsional moment for the control of an internal combustion engine is known from DE 196 12 455 A1.

SUMMARY OF THE INVENTION

The object of the invention is to provide a method and a device for monitoring a heating up of an exhaust gas catalytic converter of an internal combustion engine.

The object is achieved through the characteristics of the independent claims. Advantageous embodiments of the invention are characterized in the subclaims.

The invention is characterized by a method and a corresponding device for monitoring a heating up of an exhaust gas catalytic converter of an internal combustion engine with an intake duct with at least one cylinder that takes in the air over the intake duct, and with one exhaust gas duct in which the exhaust gas catalytic converter is placed and into which the exhaust gas resulting from the combustion of the air/fuel mixture in the cylinder flows. Input signals for the control of actuators of the internal combustion engine are created depending on measurements that are recorded by sensors, and particularly by means of control functions based on torsional moment and by means of a dynamic charging model of the intake duct. A measurement is determined that characterizes the difference of a desired air mass flow into the cylinder from an actual air mass flow into the cylinder and, depending on the quantity, is detected upon a proper or improper heating up of the exhaust gas catalytic converter.

The invention benefits from the insight that, with proper functioning of the respective actuators involved and of the intake duct for heating up the exhaust gas catalytic converter, a desired air mass flow is also actually placed into the cylinders. Only if the desired air mass flow is actually placed into the cylinders for heating up the exhaust gas catalytic converter can a sufficiently rapid heating up of the exhaust gas catalytic converter be guaranteed by means of corresponding late shift of the ignition angle, which takes place through control functions based on torsional moment. Therefore, depending on the quantity that characterizes the difference of the desired air mass flow into the cylinder from an actual air mass flow into the cylinder, a proper heating up of the exhaust gas catalytic converter can be easily detected. In this manner, the heating up of the exhaust gas catalytic converter can be monitored easily and without additional sensors.

An improper heating up of the exhaust gas catalytic converter can be caused, for example, by pressure losses in the intake duct that are higher than expected for the respective working point, which can occur, for example, if an air filter placed in the intake duct is blocked. In addition, the improper heating up of the exhaust gas catalytic converter can also be caused by an increased exhaust gas back pressure as a result of an increased flow resistance of the exhaust gas catalytic converter, which can result, for example, when individual fins of the exhaust gas catalytic converter are fused together. In addition, the improper heating up of the exhaust gas catalytic converter can also result in the actual position of the charging actuator deviating from the assumed position of the charging actuator for an internal combustion engine without confirmation of the actual position of a charging actuator.

According to an advantageous embodiment of the invention, the quantity that characterizes the difference of the desired air mass flow into the cylinder from an actual air mass flow in the cylinder is integrated during the heating up of the exhaust gas catalytic converter, and an improper heating up of the exhaust gas catalytic converter is detected if the integrated quantity exceeds a specified threshold value. In this manner, a proper heating up of the exhaust gas catalytic converter can be easily distinguished from an improper heating up of the exhaust gas catalytic converter.

According to an additional advantageous embodiment of the invention, the specified threshold value depends on at least one measurement. With a suitable choice of the measurement, the proper heating up of the exhaust gas catalytic converter can thus be distinguished even more precisely from the improper heating up of the exhaust gas catalytic converter.

In an additional advantageous embodiment of the invention, the quantity that characterizes the difference of the desired air mass flow in the cylinder from an actual air mass flow in the cylinder is the deviation of a target value for the air mass flow from an actual value of the air mass flow in the cylinder. In any case, the target value for the air mass flow and the actual value for the air mass flow are determined by means of the charging model of the intake duct and the control functions based on torsional moment, and are thus available without additional calculation effort.

According to an additional advantageous embodiment of the invention, the quantity is determined depending on a target value for an indicated torsional moment, a reference torsional moment and a target value for an indicated air pathway torsional moment that should be placed by means of at least one actuator that affects the air supply in the cylinder.

The indicated torsional moment is that torsional moment that is produced by means of the combustion of the air/fuel mixture in the cylinder without consideration of losses as a result of, for example, friction or as a result of pump losses or other losses. The reference value for the indicated torsional moment is that indicated torsional moment that is theoretically produced in the cylinder if the actuator parameters that affect the production of the torsional moment, such as, for example, the ignition angle, the air/fuel ratio in the cylinder or optionally a cylinder cut-off, are included with regard to the production of the greatest possible torsional moment.

In this manner, the quantity can also be easily determined because the target values for the indicated torsional moment, the reference value for the indicated torsional moment and the target value for the indicated air pathway torsional moment is determined in any case from the control functions based on torsional moment and by means of the dynamic charging model of the intake duct.

It is particularly advantageous in this context if the quantity is determined depending on the difference of the quotients of the target value for the indicated torsional moment and the target value for the indicated air pathway torsional moment and of the target value for the indicated torsional moment and of the reference torsional moment. A very precise identification of a proper or improper heating up of the exhaust gas catalytic converter is made possible in this way.

BRIEF DESCRIPTION OF THE DRAWINGS

Exemplary embodiments of the invention are explained in greater detail in the following with the schematic diagrams. They show.

DETAILED DESCRIPTION OF THE INVENTION

Figure 1:
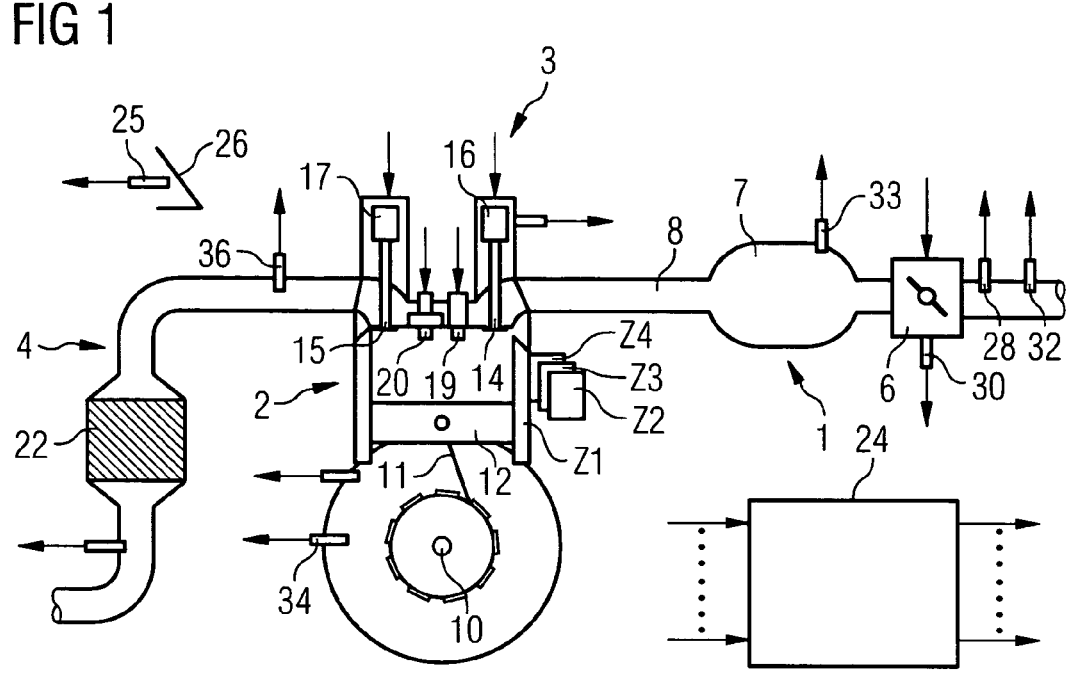
FIG. 1 an internal combustion engine with a control device
FIG. 2 a block diagram of the control device
FIG. 3 a flowchart of a first embodiment of a program for monitoring the heating up of an exhaust gas catalytic converter and
FIG. 4 an additional flowchart of a second embodiment of the program for monitoring the heating up of an exhaust gas catalytic converter.

An internal combustion engine (FIG. 1) includes an intake duct 1, an engine block 2, a cylinder head 3 and an exhaust gas duct 4. The intake duct 1 preferably includes a throttle valve 6, additionally an accumulator 7 and an intake tube 8 that is routed into the engine block 2 via an intake port to a cylinder Z1. The engine block 2 also includes a crankshaft 10, which is coupled with the piston 12 of the cylinder Z1 via a connecting rod 11.

The cylinder head 3 includes a valve train with a gas inlet valve 14, a gas outlet valve 15 and valve operating mechanisms 16, 17. The cylinder head 3 also includes an injection valve 19 and a spark plug 20. Alternatively, the injection valve 19 can also be placed in the suction tube 8.

The exhaust gas duct 4 includes a catalytic converter 22 that is constructed as a three-way catalytic converter.

A control device 24 is provided to which sensors are assigned that collect various measurements and in each case determine the measurement value for the measurement. The control device 24 determines variables depending on at least one of the measurements, which are then converted into one or more input signals for controlling the actuators by means of corresponding actuator drives.

The sensors are a pedal position sensor 25, which measures an accelerator pedal position PV; an air mass analyzer 28, which measures an air mass flow upstream of the throttle valve 6; a temperature sensor 32, which measures the intake air temperature; a suction tube pressure sensor 33, which measures a suction tube pressure in the accumulator 7; a crankshaft angle sensor 34, which measures a crankshaft angle with which a rotational speed N is then associated. Also provided is an oxygen probe 36 whose measurement signal is characteristic of the air/fuel ratio in the cylinder Z1. Depending on the embodiment of the invention, an arbitrary subset of the mentioned sensors can be present, or there can also be additional sensors present.

The actuators are, for example, the throttle valve 6, the gas inlet and gas outlet valves 14, 15, the injection valve 19 or the spark plug 20. However, there can also be additional actuators provided, such as, for example, a pulse charging valve or a switch valve in the suction tube, or there can also be an idle speed charging actuator provided in the case of a throttle valve mechanically coupled with the accelerator pedal.

In addition to the cylinder Z1 there are also preferably yet additional cylinders Z2 to Z4 provided, to which corresponding actuators are then likewise assigned.

Figure 2:
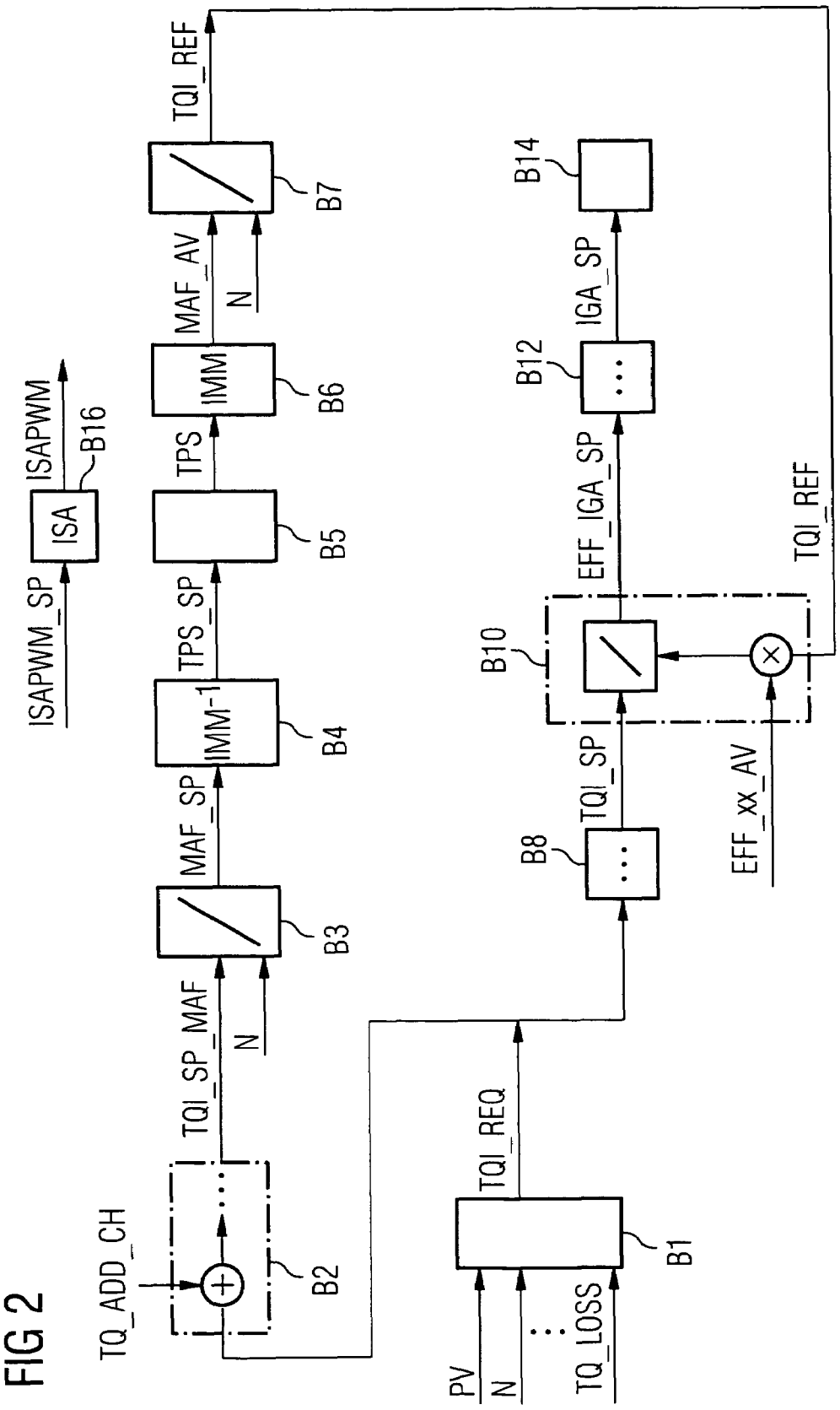

A block diagram of the control device 24 is explained in greater detail below in FIG. 2.

A desired transient indicated torsional moment that represents the driver's wishes is determined in a block B1, depending on the accelerator pedal position PV, the rotational speed N, a loss torsional moment TQ_LOSS and optionally additional measurements. The loss torsional moment TQ_LOSS is preferably determined depending on the rotational speed N, an actual value of the air mass flow MAF_AV in the cylinder Z1 to Z4 and optionally on additional measurements such as the coolant temperature or an intake air temperature. The loss torsional moment TQ_LOSS accounts for the losses that actually occur, such as those brought about by friction, by pump losses or other losses, for example.

A target value TQI_SP_MAF for an indicated air pathway torsional moment is determined in a block B2. This takes place depending on the desired transient indicated torsional moment TQI_REQ and also depending on additional torsional moment requirements, such as a torsional moment requirement TQ_ADD_CH for heating the catalytic converter.

A target value MAF_SP for the air mass flow in the cylinder Z1 to Z4 is then determined in a block B3, depending on the target value TQI_SP_MAF for the indicated air pathway torsional moment and the rotational speed N. This preferably takes place by means of a characteristics diagram and corresponding characteristics diagram interpolation.

A target value TPS_SP for the position of the throttle valves is subsequently determined in a block B4 by means of an inverted dynamic charging model $IMM^{-1}$ for the intake duct 1. A dynamic charging model of this type is revealed, for example, in the reference book "Handbuch Verbrennungsmotor" (Internal Combustion Engine Manual), 2nd edition, pages 557 and following pages, and in WO 97/35106, whose content is hereby included in this respect.

Depending on the target value TPS_SP for the position of the throttle valves, an actuator signal TPS is determined in a block B5 for the creation of a position of the throttle valves for the throttle valve 6, and namely preferably by means of a regulator that minimizes a difference of the target value TPS_SP and a measured actual value of the position of the throttle valves. A corresponding actuator drive for the throttle valve 6 is then controlled by means of the actuator signal TPS for the adjustment of the position of the throttle valves.

In addition, the actuator signal TPS for the adjustment of the position of the throttle valves is an input signal for a block B6. Alternatively, an actual measured position of the throttle valve 6 can also be an input signal in the block B6. An actual value MAF_AV for the air mass flow in the respective cylinder Z1 to Z4 is then determined in the block B6 by means of the dynamic charging model IMM for the intake duct A1.

A reference torsional moment TQI_REF is determined in a block B7 depending on the actual value MAF_AV for the air mass flow in the respective cylinder Z1 to Z4 and the rotational speed N. The reference torsional moment TQI_REF is that torsional moment that theoretically adjusts for the corresponding values of the actual value MAF_AV for the air mass flow and the rotational speed N under the condition that the parameters affecting the combustion of the air/fuel mixture in the cylinder are adjusted such that a maximum torsional moment results.

The determination of the reference torsional moment in the block B7 preferably takes place by means of a characteristics diagram and corresponding characteristics diagram interpolation. The characteristics diagrams for blocks B3 and B7 are preferably determined in advance by means of experiments on an engine test stand or also by means of simulations.

A target value TQI_SP is determined in a block B8 for the indicated torsional moment and in fact dependent on the desired transient indicated torsional moment TQI_REQ and optionally additional torsional moment requirements. The target value TQI_SP for the indicated torsional moment is that which should actually be adjusted in the respective cylinder Z1 to Z4 by means of the combustion of the air/fuel mixture. In contrast to this, the target value TQI_SP_MAF includes the indicated air pathway torsional moment and optionally a corresponding charging rate action in order to make possible a rapid adjustment of the indicated torsional moment TQI_SP or, in the case of the heating up of the exhaust gas catalytic converter 22, a production of an increased exhaust gas temperature.

On one hand, the reference torsional moment TQI_REF is multiplied with an actual value EFF_XXX_AV from other efficiency parameters in a block B10, which refers to all efficiency parameters relevant for the combustion process apart from an ignition angle efficiency. On the other hand, the target value TQI_SP for the indicated torsional moment is divided by the product in block B10 and thus determines a target value EFF_IGA_SP for the ignition angle efficiency. The target value EFF_IGA_SP for the ignition angle efficiency, for example during the heating up of the exhaust gas catalytic converter 22 for the proper heating of the exhaust gas catalytic converter 22, approximately amounts to the value 0.5.

Depending on the target value EFF_IGA_SP for the ignition angle efficiency, a target value IGA_SP for the ignition angle is determined in a block B12, and then, depending on the target value for the ignition angle IGA_SP, a corresponding actuator signal for the control of the spark plug 20 is produced in a block B14.

Alternatively or additionally, yet another or an additional actuator that affects the air supply to the respective cylinder (Z1 to Z4) can be provided with regard to the blocks B4 to B6, and corresponding target values, actual values or also input signals are determined.

If the internal combustion engine is not provided with an electronic accelerator throttle valve but rather a throttle valve mechanically coupled with the accelerator pedal and has an idle speed charging actuator, then a block B16 is provided instead of the block B5, and a target value ISAPWM_SP for the idle speed charging actuator is determined in the block B4 by means of the correspondingly modified inverse charging model $IMM^{-1}$ of the intake duct 1 and, depending on this value in the block B16, a corresponding actuator signal ISAPWM is determined for the idle speed charging actuator and is correspondingly controlled. The actuator signal ISAPWM that represents a specific degree of opening of the idle speed charging actuator and, depending on available sensors, a target value or actual value for the degree of opening of the throttle valve is subsequently conveyed to the block B6.

The torsional moment requirement TQ_ADD_CH has the value 0 while no catalyst heating of the exhaust gas catalytic converter 22 should take place. It has the value 50 Nm, for example, when the heating up of the exhaust gas catalytic converter 22 should take place.

Figure 3:
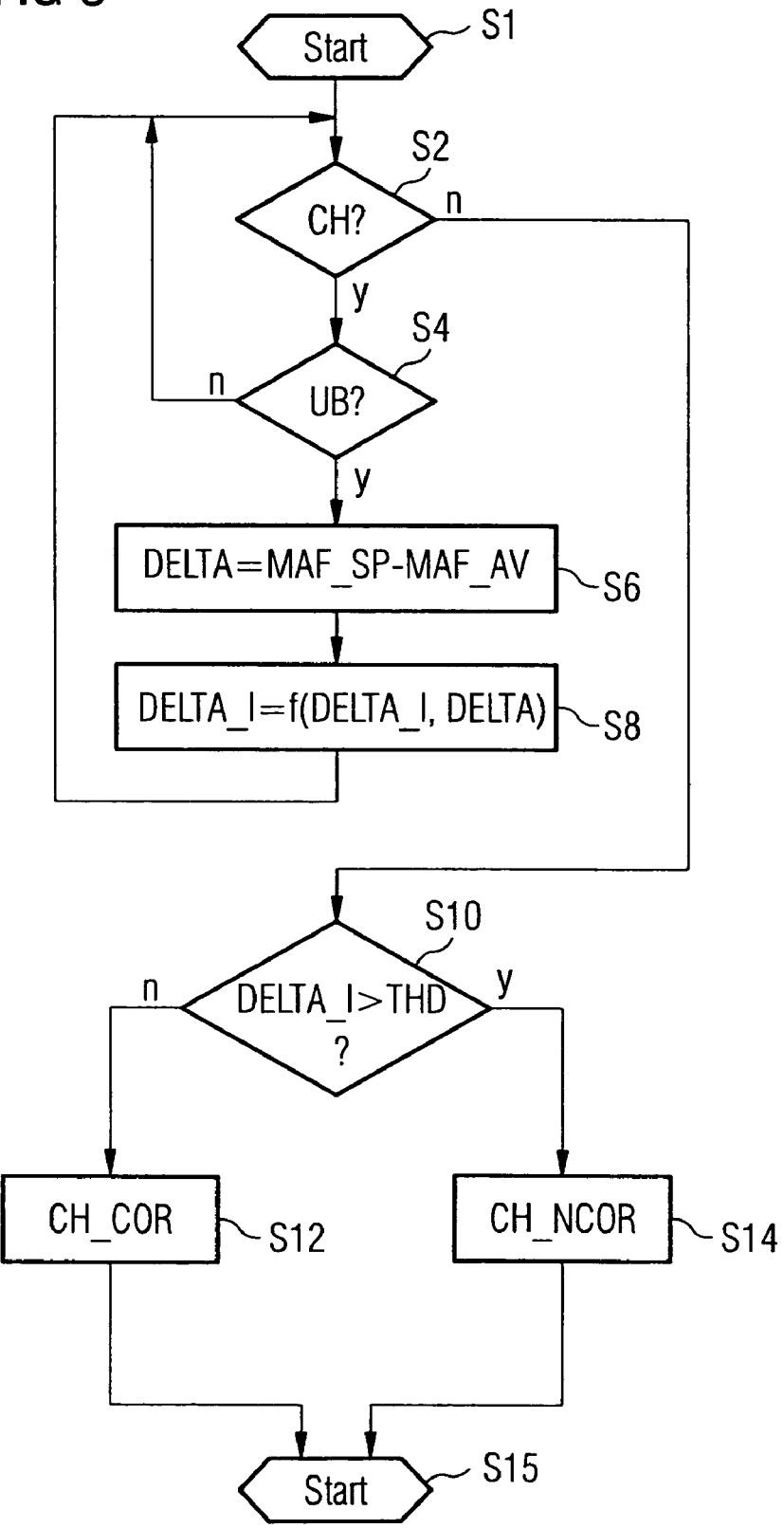

A program for monitoring the heating up of the exhaust gas catalytic converter 22 is started in a step S1 (FIG. 3) promptly at a start of the internal combustion engine. It is stored in the control device 24 and is processed there.

In a step S2 it is tested whether heating the catalytic converter CH takes place at the moment, i.e. whether the exhaust gas catalytic converter 22 should be brought to its activation temperature at the moment. If this is not the case, then the processing is continued in a step S10, which is explained in greater detail further below.

If the condition of step S2 is fulfilled, however, then it is tested in a step S4 whether one or more specified monitoring conditions UB are fulfilled. The monitoring conditions UB cannot be fulfilled, for example, if the current working point is transient as specified, or if the internal combustion engine will be operated in the range of specified high loads. If the condition of step S4 is not fulfilled, then the processing is once again continued in step S2, and optionally after a waiting period that is provided in advance.

If the condition of step S4 is fulfilled, however, then a difference value DELTA is determined in a step S6 through the generation of the difference of the target value and of the actual value of the air mass flow in the respective cylinder Z1 to Z4.

An integrated difference value DELTA_I is determined in a step S8 through the integration of the difference value DELTA. This preferably takes place for each calculation cycle through corresponding weighting of the current difference value DELTA and adding of the integrated difference value DELTA_I determined in the previous calculation cycle. At the same time, the respective contribution can be added to the integral, likewise dependent on one or more weighted dependent measurements.

Subsequent to step S8, the processing is once again continued in step S2, and optionally after the expiration of the specified waiting period.

In step S10, it is tested whether the integrated difference value DELTA_I is greater than a threshold value THD. The threshold value can be definitely specified in a simple embodiment. However, it can also be dependent on at least one measurement value or one or more measurements derived from at least one measurement value. In this case, then, an even more accurate monitoring of the heating up of the exhaust gas catalytic converter 22 can take place, optionally depending on working point.

If the condition of step S10 is not fulfilled, then the processing is once again continued in a'step S12, in which a marker CH_COR is set for a proper heating up of the exhaust gas catalytic converter 22. However, if the condition of step S10 is fulfilled, then a marker CH_NCOR is set for an improper heating up of the exhaust gas catalytic converter 22 in a step S14. Subsequent to steps S12 and S14, the program is ended in step S15. Depending on the markers set in steps S12 and S14, a notice can then be provided to the driver to find a workshop in the case of step 14, for example.

Figure 4:
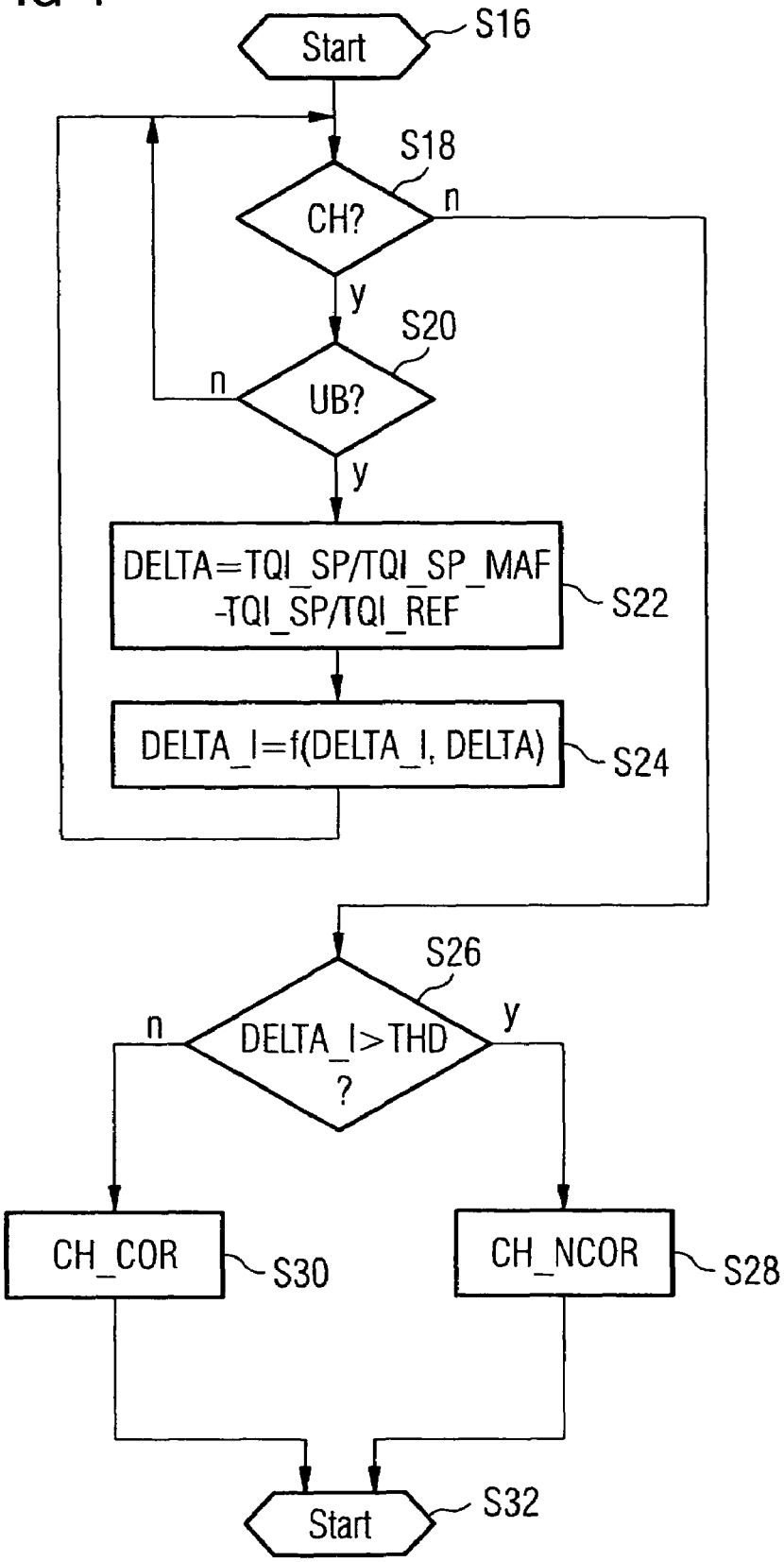

FIG. 4 shows a second embodiment of a program for monitoring the heating up of the exhaust gas catalytic converter 22. The program is started in a step S16 corresponding to step S1. Steps S18, S20, S24, S26, S28, S30 and S32 correspond to steps S2, S4, S8, S10, S12, S14 and S15. If the condition of step S20 is fulfilled, i.e. the monitoring conditions UB are fulfilled, then the difference value DELTA is determined in a step S22, dependent on the target value TQI_SP of the indicated torsional moment, the target value TQI_SP_MAF of the indicated air pathway torsional moment and of the reference torsional moment TWI_REF. This preferably takes place by means of the relationship specified in step S22.

The threshold value THD is preferably determined through experiments with the internal combustion engine, for example, determined on a engine test stand or through simulations in such a way, in fact, that exceeding the integrated difference value DELTA_I of the threshold value THD is characteristic of an improper heating up of the exhaust gas catalytic converter 22.

The invention claimed is:

1. A method for monitoring a heating up of an exhaust gas catalytic converter of an internal combustion engine, comprising:
   in-taking air into the internal combustion engine via an intake duct;
   ejecting exhaust gas resulting from the combustion of an air/fuel mixture in a cylinder into an exhaust gas catalytic converter located in an exhaust gas duct;
   generating input signals for the control of a plurality of actuators of the internal combustion engine by a control function based on a torsional moment and by a dynamic charging model of the intake duct and depending on measurement values that are determined from a plurality of sensors;
   determining a measurement that characterizes the difference of a desired air mass flow into the cylinder from an actual air mass flow into the cylinder;
   integrating the measurement during the heating up of the exhaust gas catalytic converter; and
   identifying an improper heating up of the exhaust gas catalytic converter if the integrated measurement exceeds a specified threshold value.

2. The method according to claim 1, wherein the specified threshold value is determined dependent on at least one measurement value.

3. The method according to claim 1, wherein the measurement is a difference between the target value for the air mass flow and the actual value of the air mass flow in the respective cylinder.

4. The method according to claim 1, wherein the measurement depends on a target value of an indicated torsional moment, a reference torsional moment and a target value of an indicated air pathway torsional moment, which should be placed by an actuator that affects the air supply to the cylinder.

5. The method according to claim 4, wherein the measurement depends on a difference between the quotients of the target value for the indicated torsional moment and the target value for the indicated air pathway torsional moment and for the indicated torsional moment and for the reference torsional moment.

6. A device for monitoring a heating up of a exhaust gas catalytic converter of an internal combustion engine, comprising:
   an intake duct;
   a cylinder that takes in air via the intake duct;
   an exhaust gas duct having an exhaust, gas catalytic converter located within and into which the exhaust gas resulting from the combustion of the air/fuel mixture in the cylinder is ejected;
   input signals generated for the control of actuators of the internal combustion engine by a control function based on a torsional moment and by a dynamic charging model of the intake duct and that depend on measurement values that are determined from sensors;
   and a measurement is determined that characterizes the difference of a desired air mass flow into the cylinder from an actual air mass flow into the cylinder such that a proper or improper heating up of the exhaust gas catalytic converter can be identified, depending on the measurement, wherein the measurement is during the heating up of the exhaust gas catalytic converter is integrated and an improper heating up of the exhaust gas catalytic converter is identified if the integrated measurement exceeds a specified threshold value.

7. The device according to claim 6, wherein the specified threshold value is determined dependent on at least one measurement value.

8. The device according to claim 6, wherein the measurement depends on a target value of an indicated torsional moment, a reference torsional moment and a target value of an indicated air pathway torsional moment, which should be placed by an actuator that affects the air supply to the cylinder.

9. The device according to claim 8, wherein the measurement depends on a difference between the quotients of the target value for the indicated torsional moment and the target value for the indicated air pathway torsional moment and for the indicated torsional moment and for the reference torsional moment.

10. A method for monitoring a heating up of an exhaust gas catalytic converter of an internal combustion engine, comprising:

in-taking air into the internal combustion engine via an intake duct;

ejecting exhaust gas resulting from the combustion of an air/fuel mixture in a cylinder into an exhaust gas catalytic converter located in an exhaust gas duct;

generating input signals for the control of a plurality of actuators of the internal combustion engine by a control function based on measurement values that are determined from a plurality of sensors;

determining a measurement that characterizes the difference of a target air mass flow into the cylinder from an actual air mass flow into the cylinder;

integrating the measurement during the heating up of the exhaust gas catalytic converter; and identifying an improper heating up of the exhaust gas catalytic converter if the integrated measurement exceeds a specified threshold value.

11. The method according to claim 10, wherein the specified threshold value is determined dependent on at least one measurement value.

12. The method according to claim 10, wherein the measurement depends on a target value of an indicated torsional moment, a reference torsional moment, and a target value of an indicated air pathway torsional moment.

13. The method according to claim 12, wherein the measurement depends on a difference between (a) the quotient of the target value for the indicated torsional moment and the target value for the indicated air pathway torsional moment and (b) the quotient of the target value for the indicated torsional moment and the target value for the reference torsional moment.

\* \* \* \* \*